Feb. 26, 1957

H. J. ECKWEILER 2,782,675

ARTIFICIAL HORIZON

Filed Dec. 10, 1952

INVENTOR.
HOWARD J. ECKWEILER

BY Oskrlenk & Faber

ATTORNEYS

United States Patent Office 2,782,675
Patented Feb. 26, 1957

2,782,675

ARTIFICIAL HORIZON

Howard J. Eckweiler, Manhasset, N. Y., assignor to Kollsman Instrument Corporation, Elmhurst, N. Y., a corporation of New York Application December 10, 1952, Serial No. 325,159

3 Claims. (Cl. 88—1)

The present invention relates to means for determining the relation of a point of observation to a place of reference and more particularly to a means for providing an indication of a horizontal plane in an optical system utilizing the reflection of the image of an illuminated aperture from the surface of a reflecting liquid.

Horizontal plane determining means are used in connection with optical systems in altitude measuring instruments and in elevation measuring instruments. A sextant, for example, measures the altitude of a celestial body by reference to the angle that the celestial body makes with a horizontal plane at the observation point.

Heretofore in the prior art the artificial means for establishing a horizontal reference plane have included gyroscopic means, pendulums, and illuminated bubbles.

It is desirable to have the images of the sighted object and the horizontal reference means simultaneously observable.

It is, therefore, a primary object of the present invention to provide a novel optical horizontal reference in which the refraction from a transparent fluid is utilized to provide the horizontal reference.

Still another object of the present invention is to provide a chamber construction for a horizontal reference which will permit universal tilting of the chamber without changing the characteristics of the optical path within the chamber.

Still another object of the present invention is the provision of novel artificial horizon means of simple and economical construction.

Still another object of the present invention is the provision of a novel artificial horizon means utilizing a liquid wherein the relatively small expansions and contractions of the liquid due to variations in ambient conditions have negligible effect on the accuracy of the artificial horizon as a reference.

Still another object of the present invention is the provision of a novel artificial horizon means which can produce a sharply defined reference image.

Still another object of the present invention is the provision of a novel artificial horizon means utilizing a double refraction of light.

The present invention is carried out by providing a means for illuminating the floor of a chamber which is a concave mirror through a slit and viscous transparent fluid. A transparent reflecting glass at 45° to the path of the reflected light reflects the image to the eyepiece. The image of the slit joins the image of the objective before it reaches the eyepiece.

The foregoing and many other objects of the invention will become apparent in the following description and drawing in which.

Figure 2:
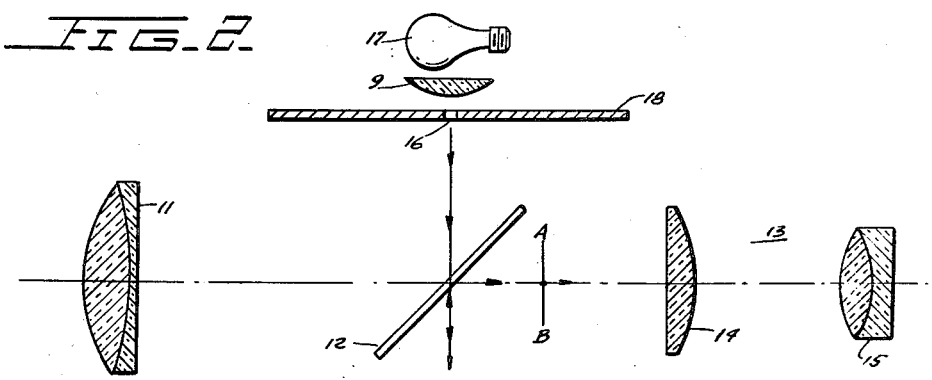
Figure 2 is a diagrammatic view of a simple optical system shown, wherein the surface refraction is accomplished twice.

Referring now to Figure 2, the optical horizonal reference is shown as it might be utilized in its simplest form to level an instrument. It is readily understood, however, that the artificial horizon may be used in any other application where it is necessary to determine the vertical or horizontal reference as in leveling tables, sextants, and other general constructions in which a horizontal or vertical reference is desired.

In the simple leveling instrument herein disclosed there is shown an objective lens 11 whose focal plane is at AB. The image of the objective passes through a transparent-reflecting glass or pellicle 12 before reaching the focal plane AB and thereafter enters the eyepiece 13 consisting of lenses 14 and 15.

An artificial horizon is indicated by providing the image of a slit 16 (in mask 18), hereinafter described, at the focal plane AB.

A light source 17 shown as an incandescent lamp illuminates the slit 16 in mask 18 through a condensor lens 9. The light from the illuminated slit 16 in mask 18 passes through the pellicle 12 which is positioned at a 45° angle with respect to the axis of the optical system described above.

After passing through lens 12, the light rays from the illuminated slit pass through the liquid 20 in housing 23 (Figure 1) and are reflected from the concave mirror 21 which is the floor of a chamber 22.

The reflected image passes again through the liquid 20 to the reflecting surface of the pellicle 12, described above, which is also at a 45° angle to the longitudinal axis of the concave mirror 21 as well as to the optical path of the objective image.

The reflected image is then reflected again from the pellicle 12 essentially along the same optical axis described above forming a real image of the illuminated slit 16 at the focal plane AB.

The correspondence of the image of the illuminated slit 16 and the image of the observed object can be used as is hereinafter described to indicate that the level of the observed object is the same as the line of sight or the optical axis of the instrument.

The concave mirror 21 is so located and so shaped as to have its focal distance which is the combined horizontal and vertical optical distance from it to the focal plane AB equal to one-half of the focal length of the objective lens 11. When so shaped and located, the angular movements of the optical axis and the slit image will be the same and no accommodation of the eye will be required to view simultaneously the slit image and the observed objective.

The coincidence of the slit image with an observed object may be used to indicate that the level of the object is the same as that of the line of sight of the instrument. If it is desired to maintain the axis of the instrument itself horizontal, as in a level, a simple transparent reticle (not shown) may be placed at the focal plane AB so that the slit image may be imposed thereon to establish the instrument axis in a horizontal plane.

The optical system comprises an objective lens 11, the pellicle 12 and an eyepiece 13 containing lenses 14 and 15. The focal length of the lens 11 is its distance to the plane AB.

Figure 1:
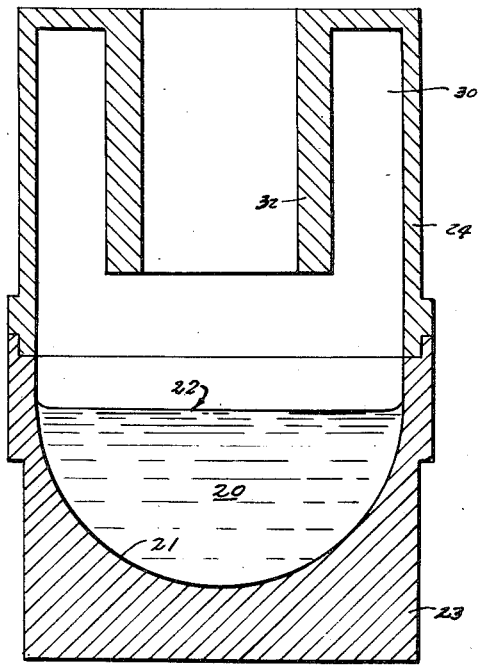
Figure 1 is a vertical sectional view of the artificial horizon of the present invention.

The structural embodiment of the artificial horizon as shown in Figure 1 provides space 30 as a trap for the liquid 20 in the event of an inversion of the optical system, thereby preventing the liquid 20 from being thrown out of the liquid chamber. The chamber or housing carries a cover plate 24 having an internal inwardly projecting flange 32 defining an annular space 30 described above as a trap for the liquid 20 in the event of an inversion of the artificial horizontal reference.

In the preferred form, the liquid 20 is viscous silicone and half fills the fluid chamber 22.

With tilting of the whole assembly which is the same as relatively tilting the silicone surface, the rays of light undergo refraction twice in the liquid 20 to displace the slit or aperture 16 image by an angle which will compensate for the angle of tilt to provide a universal level which is, in effect, truly horizontal despite tilting of the mechanism.

The horizontal reference is described in conjunction with a simple optical system but may be used, however, with a scanning phototube servomechanism (not shown) which levels an assembly in either one or two degrees of freedom.

Various modifications of the present invention will be evident to those skilled in the art, for example, providing a cover plate to seal the chamber 22 and designing the optical paths and structure to take into account the diffractions resulting therefrom.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. An optical instrument comprising in combination an optical sighting system and artificial horizon means, said optical sighting system comprising means developing an original line of sight including an objective lens, said artificial horizon means comprising a restricted light source, a semi-transparent glass in the line of sight of said optical sighting system and in the path of light from said restricted source, a light transmitting fluid having a surface at which the light from said source is refracted, an enclosure for said fluid, a concave mirror forming the bottom of said enclosure and holding said fluid, said concave mirror and refracting liquid therein forming an optical system for projecting an image of said restricted light source in the said line of sight, said concave mirror facing said semi-transparent glass and being positioned at a distance therefrom so as to project said image to the focal point of said objective lens of said optical sighting system and providing an indication of the horizon in the line of sight thereof.

2. An optical instrument as set forth in claim 1, wherein the combined horizontal and vertical optical distance from said concave mirror to said focal point is equal to the focal length of said mirror and is one-half of the focal length of said objective lens.

3. In an optical instrument as set forth in claim 1, said light transmitting fluid being a viscous silicone liquid.

References Cited in the file of this patent

UNITED STATES PATENTS

| | | |
|---|---|---|
| 2,313,204 | Morelle | Mar. 9, 1943 |
| 2,358,316 | Chwalow | Sept. 19, 1944 |
| 2,395,921 | Thurlow | Mar. 5, 1946 |
| 2,460,836 | Lovins | Feb. 8, 1949 |
| 2,557,340 | Carbonara | June 19, 1951 |